United States Patent
Williams

(10) Patent No.: US 6,738,229 B2
(45) Date of Patent: May 18, 2004

(54) HEAD STACK ASSEMBLY HAVING DECREASED TRACK MISREGISTRATION CHARACTERISTICS

(75) Inventor: Stephen P. Williams, Morgan Hill, CA (US)

(73) Assignee: Maxtor Corporation, Longmont, CO (US)

( * ) Notice: Subject to any disclaimer, the term of this patent is extended or adjusted under 35 U.S.C. 154(b) by 98 days.

(21) Appl. No.: 09/752,374

(22) Filed: Dec. 29, 2000

(65) Prior Publication Data

US 2002/0085314 A1 Jul. 4, 2002

(51) Int. Cl.[7] ................................................. G11B 5/58
(52) U.S. Cl. .............................. 360/266.1; 360/265.7; 360/265.9
(58) Field of Search ........................... 360/266.1, 266, 360/265.7, 265.8, 265.9, 244.2, 444.3, 244.4, 244.8, 244.9, 245.9

(56) References Cited

U.S. PATENT DOCUMENTS

| | | | | |
|---|---|---|---|---|
| 5,040,086 A | * | 8/1991 | Hibino | 360/264.1 |
| 5,835,311 A | * | 11/1998 | Brooks et al. | 360/265.9 |
| 6,088,192 A | | 7/2000 | Riener et al. | |
| 6,271,996 B1 | * | 8/2001 | Houk et al. | 360/244.9 |
| 6,353,515 B1 | * | 3/2002 | Heim | 360/245.9 |
| 6,388,842 B1 | * | 5/2002 | Murphy | 360/244.8 |
| 6,462,910 B1 | * | 10/2002 | Shimizu et al. | 360/244.8 |
| 6,477,017 B2 | * | 11/2002 | Kohei et al. | 360/265.9 |

FOREIGN PATENT DOCUMENTS

WO     WO 98 06092    * 12/1998

* cited by examiner

Primary Examiner—Tianjie Chen
(74) Attorney, Agent, or Firm—James P. Broder; Steven G. Roeder

(57) ABSTRACT

An E-block (20) and head stack assembly (15) for maintaining one or more data transducers (18) proximate one or more rotating storage disks (28) of a disk drive (10) is provided herein. The E-block (20) includes an actuator hub (52) and one or more actuator arms (22). The actuator arms (22) cantilever away from the actuator hub (52) and hold the data transducers (18) proximate the rotating storage disks (28). As provided herein, at least one of the actuator arms (22) has a roll-bias angle (70) over the majority of the length of the actuator arm (22). Moreover, the head stack assembly (15) maintains a suspension assembly (24) at a reduced suspension z-height (72) relative to the storage disk (28). As provided herein, the roll-bias angle (70) of the actuator arms (22) and the reduced suspension z-height (72), each decrease track misregistration.

34 Claims, 13 Drawing Sheets

HEAD STACK ASSEMBLY HAVING DECREASED TRACK MISREGISTRATION CHARACTERISTICS

FIELD OF THE INVENTION

The present invention relates generally to disk drives for storing data. More specifically, the present invention relates to a head stack assembly and an E-block that decrease track misregistration.

BACKGROUND

Disk drives are widely used in computers and data processing systems for storing information in digital form. These disk drives commonly use one or more rotating storage disks to store data in digital form. Each storage disk typically includes a data storage surface on each side of the storage disk. These storage surfaces are divided into a plurality of narrow, annular, regions of different radii, commonly referred to as "tracks". Typically, an E-block having one or more actuator arms is used to position a data transducer proximate each data storage surface of each storage disk. Each data transducer is secured to one actuator arm with a suspension assembly. The data transducer is positioned at a target track on the storage surface in order to access information from, or transfer information to, the storage disk. The E-block is moved with an actuator motor relative to the storage disks. Depending upon the design of the disk drive, each actuator arm can retain one or two transducer assemblies.

The accurate and stable positioning of each data transducer near each data storage surface is critical to the transfer and retrieval of information from the disks. As a result thereof, vibration in the E-block, the suspension assemblies and the storage disks can cause errors in data transfers due to inaccuracies in the positioning of the data transducers relative to the storage disks. This is commonly referred to as "track misregistration." The desire to increase performance characteristics of disk drives has resulted in increased rotational velocity of storage disks. Unfortunately, as disk speeds increase, aerodynamic forces also increase. This causes the storage disks to vibrate in the vertical direction, commonly referred to as "out-of-plane" movements. Such movements can result in an increased difficulty of maintaining the data transducer on the target track and increased inaccuracies in data transfers.

Further, the E-block, suspension assemblies, and the storage disks have modes of vibrations that cause track misregistration. Some of these modes of vibration are prevalent due to the existence of a kinematic relationship between the actuator arms, the suspension assemblies and the storage disks. More specifically, as the storage disk moves vertically because of out-of-plane irregularities of the storage disk, the suspension assembly hinges and the data transducer moves with respect to the surface of the storage disk. This off-track motion is extremely difficult or impossible to follow with the actuator motor.

Moreover, the vibrational forces on the storage disks cause the storage disks to deviate from its usual rotational plane and displacement of the data transducer from the target track. This displacement occurs in both an out-of-plane direction, as well as in a radial direction. The data transducer attempts to follow the disk contour, but in so doing, the data transducer moves off-track, resulting in track misregistration. Therefore, the radial and out-of-plane movements are said to be "coupled" to the track misregistration parameter. Such coupling occurs in disk drives where the storage disks and the actuator arms rotate in parallel planes.

A detailed description of the various problems associated with track misregistration due to vibration of the E-block, suspension assemblies, and out-of-plane motion of the storage disks is provided in U.S. Pat. No. 6,088,192, issued to Riener et al., and assigned to Quantum Corporation, the assignee of the present invention. The contents of U.S. Pat. No. 6,088,192 are incorporated herein by reference.

One attempt to reduce off track motion of the data transducer includes angling the suspension assembly and the data transducer in a roll direction. However, the arm bending mode of the E-block introduces an off-track component that is not significantly impacted by providing a roll angle to the suspension assembly and the data transducer.

Another attempt to minimize off track motion of the data transducer involves using thicker storage disks to minimize disk vibration. However, this design results in a greater thickness of the overall disk drive, and increased costs in manufacturing the disk drive.

Yet another attempt to reduce off track motion of the data transducer includes the addition of microactuators to adjust the position of the data transducers to compensate for the movements of the data transducers relative to the target track. Unfortunately, the addition of microactuators is costly, and further adds another level of complexity to the disk drive. Moreover, microactuators and the necessary electrical circuitry can require additional space within the drive housing, which can make such implementation difficult.

Still another attempt includes the addition of baffles to disrupt airflow across the actuator arms, the suspension assemblies, and disk motion induced by air turbulence. Unfortunately, this design is also not completely satisfactory.

In light of the above, there is the need for a disk drive, head stack assembly, and an E-block that minimizes track misregistration. Additionally, there is a need to provide an E-block having improved vibration and resonance characteristics, and which improves the performance of the disk drive. Further, there is a need for a head stack assembly that closely and accurately follows a data track despite out-of-plane disk motion, vibration of the actuator arms and/or vibration of the suspension assemblies. Moreover, there is a need for a head stack assembly having improved track-following characteristics that are relatively easy and inexpensive to manufacture.

SUMMARY

The present invention is directed to an E-block and a head stack assembly for a disk drive. The E-block includes an actuator hub and a first actuator arm secured to the actuator hub. The first actuator arm maintains a first data transducer near a first storage disk. Uniquely, the first actuator arm has a roll-bias angle along the majority of the length of the first actuator arm. The roll-bias angle has an absolute value of greater than zero degrees relative to the first storage disk. Preferably, the roll-bias angle is incorporated into substantially the entire length of the first actuator arm.

Importantly, by incorporating the roll-bias angle into the majority of the length of the first actuator arm, vibration of the first actuator arm and out-of-plane motion of the rotating first storage disk will have a reduced effect on the accurate positioning of the first data transducer relative to the first storage disk.

As used herein, the term "roll-bias angle" refers to the angle formed by the actuator arm relative to the plane of a storage surface of the storage disk. A negative roll-bias angle is present when a spindle side of the actuator arm is closer to the storage surface of the storage disk than a perimeter side of the actuator arm. In other words, the actuator arm is "tilted" toward a disk axis of the storage disk. A positive roll-bias angle occurs when the actuator arm is tilted in the opposite direction, i.e. away from the disk axis of the storage disk.

As used herein, the term "skew angle" refers to the orientation of the actuator arm and the attached data transducer relative to the storage disk. A "zero skew angle" occurs when a longitudinal axis of the actuator arm forms a ninety degree angle with a radial line from the disk axis to the data transducer. At a zero skew angle, the longitudinal axis of the actuator arm is coplanar with a line that is tangent to a curve of the track immediately adjacent to the data transducer. At a zero skew angle, there is no "straining" of the data transducer to remain on track. At a "negative skew angle", the longitudinal axis of the actuator arm forms an obtuse angle with the radial line from the disk axis to the data transducer, i.e. the data transducer has moved from zero skew toward an inner diameter of the storage disk. A "positive skew angle" occurs when the longitudinal axis of the actuator arm forms an acute angle with the radial line from the disk axis to the data transducer, i.e. the data transducer has moved from the zero skew toward an outer diameter of the storage disk.

As provided herein, the E-block can also include a second actuator arm positioned between adjacent first and second storage disks. In this embodiment, each actuator arm has a roll-bias angle. Further, in this design, the E-block preferably is molded and includes a separate actuator arm for each storage surface of each of the storage disks.

The head stack assembly includes a first suspension assembly that secures the first data transducer to the first actuator arm. As provided herein, the E-block is designed so that a mounting surface of the first suspension assembly is maintained at a suspension z height that minimizes track misregistration coupling induced vibration due to the arm bending mode at all skew angles. For an 11 mm long suspension assembly, the first suspension assembly is maintained at between approximately 0.40–0.65 millimeters away from the bottom of the transducer assembly when the first storage disk is rotating. This distance is referred to herein as a "suspension z-height". Importantly, by reducing the z-height, the influence of out-of-plane motion on the position of the data transducer is decreased. More specifically, the lower z-height of the suspension assembly reduces off track motion due to disk bending, reduces outer diameter to inner diameter sensitivity to skew angle, and minimizes coupling of all the actuator arm bending modes. Stated another way, the lower suspension z-height affects the skew sensitivity to the first arm bending and the disk mode coupling and reduces the track misregistration in one direction of skew to zero. In summary, by maintaining this reduced suspension z-height, the data transducer is more accurately maintained on the target track of the storage disk.

Typically, the head stack assembly includes a base plate that secures the first suspension assembly to the E-block. The base plate includes a beam mount area that engages the second beam surface of the first suspension assembly and a plate mount area that engages the actuator arm. In one embodiment, the beam mount area substantially faces the storage surface of the storage disk and the plate mount area faces in a direction that is substantially opposite the beam mount area and the storage surface of the storage disk. With this design, the base plate is positioned between the E-block and the suspension assembly and the suspension z-height of the suspension assembly is reduced by the thickness of the base plate. As a consequence thereof, the off track movement of the data transducer is reduced.

As provided herein, the arm mode sensitivity plot is approximately zero coupling at a zero skew angle, however, the disk mode coupling is at approximately 3.8% coupling at zero skew angle. Thus, adjusting the suspension Z-height alone will not completely eliminate the track misregistration of the disk modes. Preferably, in order to reduce the disk mode track misregistration, the actuator arms are also rolled.

The present invention is also directed to a method for manufacturing an E-block and a method for manufacturing a head stack assembly for a disk drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
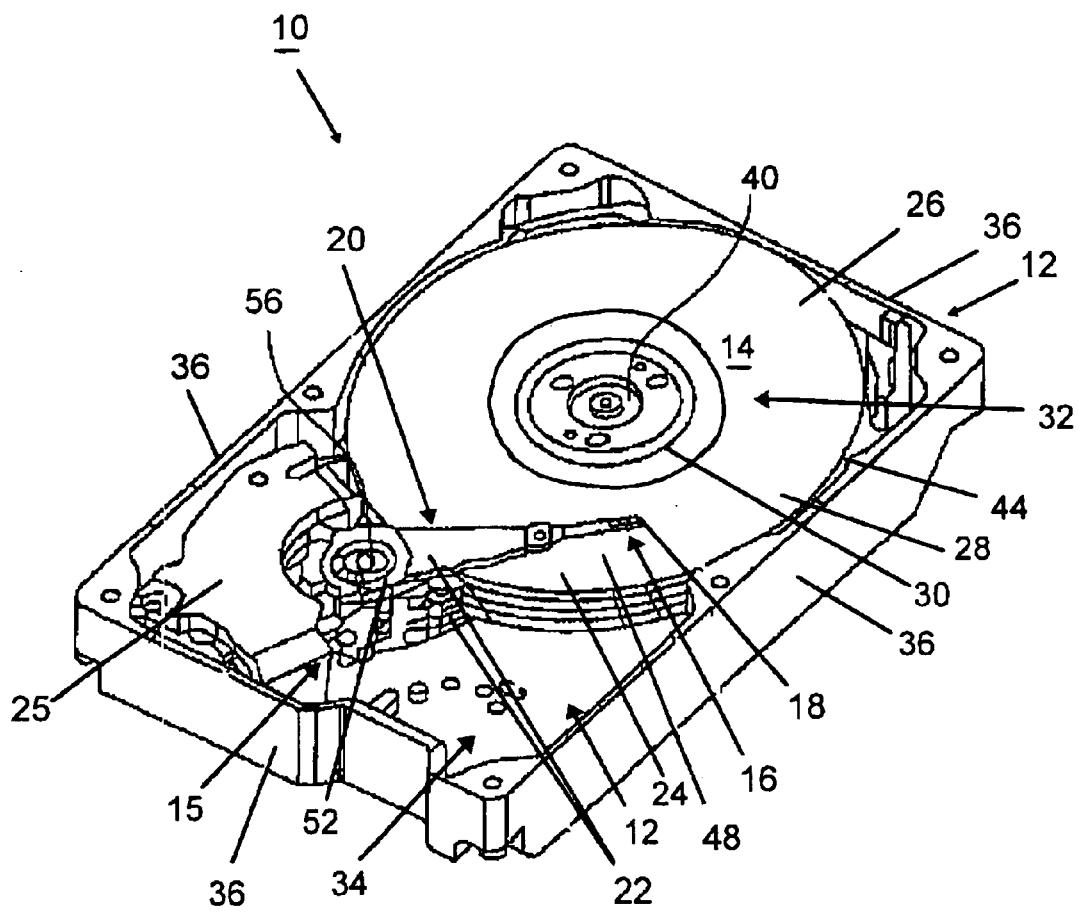
FIG. 1 is a perspective view of a disk drive having features of the present invention.

Referring initially to FIG. 1, a disk drive 10 according to the present invention includes (i) a drive housing 12, (ii) a disk assembly 14, and (iii) a head stack assembly 15. The head stack assembly 15 includes (i) one or more transducer assemblies 16, each having a data transducer 18, (ii) an E-block 20 having one or more actuator arms 22, (iii) one or more suspension assemblies 24, and (iv) an actuator mover 25. As an overview, the actuator arms 22 are uniquely shaped and designed to minimize the influence of bending of the actuator arms 22 and reduce off track motion of the data transducers 18 due to vibrations of the disk assembly 14, the actuator arms 22 and the suspension assemblies 24. Stated another way, the actuator arms 22 are designed to decouple the off-track track misregistration caused by movement of the disk assembly. This allows for more accurate positioning of the data transducers 18 and more accurate data transfers without adding significant cost or parts.

Additionally, the suspension assemblies 24 are uniquely positioned to decrease track misregistration when the data transducer 18 is positioned at all skew angles, from an outside diameter 26 of a storage disk 28 to an inside diameter 30 of the storage disk 28. Preferably, the head stack assembly 15 includes both a unique actuator arm 22 shape and improved positioning of the suspension assembly 24 to decrease off track motion, as more fully set forth below.

A detailed description of the various components of a disk drive 10 is provided in U.S. Pat. No. 5,208,712, issued to Hatch et al. The contents of U.S. Pat. No. 5,208,712 are incorporated herein by reference.

The drive housing 12 retains the various components of the disk drive 10. Referring to FIG. 1, the drive housing 12 includes a base 34 and four (4) side walls 36. A typical drive housing 12 also includes a cover (not shown), which is spaced apart from the base 34 by the side walls 36. The drive housing 12 is typically installed in the case of a computer (not shown), a word processor (not shown), or audio and video equipment (not shown).

The disk assembly 14 includes one or more storage disks 28 that store data in a form that can be subsequently retrieved if necessary. Magnetic storage disks are commonly used to store data in digital form. For conservation of space, each storage disk 28 preferably includes a top data storage surface 38A (illustrated in FIG. 3A) on one side of the storage disk 28 and a bottom storage surface 38B (illustrated in FIG. 3A) on another side of the storage disk 28. These storage surfaces 38A, 38B are typically divided into a plurality of narrow annular regions (not shown) of different radii, commonly referred to as "tracks." The storage disks 28 are manufactured by ways known to those skilled in the art.

Depending upon the design of the disk drive 10, any number of storage disks 28 can be used with the disk drive 10. For example, the disk drive 10 can include one (1), two (2), three (3), six (6), nine (9), or twelve (12) storage disks. For two-sided storage disks 28, the storage disks 28 are spaced apart a sufficient distance so that at least one (1) transducer assembly 16 can be positioned proximate each of the storage surfaces 38A, 38B of adjacent storage disks 28. As explained in more detail below, the storage disks 28 can be spaced apart a sufficient distance to accommodate two actuator arms 22 positioned there between.

The target track 32 that contains the desired data (not shown) is illustrated in FIG. 1 on the top storage surface 38A on the top storage disk 38. It should be noted that the target track 32 illustrated in FIG. 1 is for reference and that any of the tracks on any of the storage disks 38 can be the designated target track 32.

Referring to FIG. 1, the storage disks 28 are spaced apart on a disk spindle 40 that is mounted to a spindle shaft (not shown) that is secured to the base 34. The disk spindle 40 rotates on a disk axis 42 relative to the spindle shaft (not shown) on a spindle bearing assembly (not shown). Typically, the disk spindle 40 and the storage disks 28 are rotated about the disk axis 42 at a predetermined angular velocity by a spindle motor (not shown). Each storage disk 28 further includes a disk perimeter 44 located at the outer diameter 26 of the storage disk 28.

The rotation rate of the storage disks 28 varies according to the design of the disk drive 10. Presently, disk drives 10 utilize storage disks 28 rotated at an angular velocity of between about 4,500 RPM to 10,000 RPM. It is anticipated that technological advances will allow for disk drives 10 having storage disks 28 which rotate at higher speeds, such as approximately 15,000 or more RPM. Disk drives 10 with these higher rotational velocities can have the undesirable effect of making the target track 32 more difficult to follow. However, the head stack assembly 15 provided herein is particularly useful for minimizing track misregistration in higher speed disk drives.

Figure 5A:
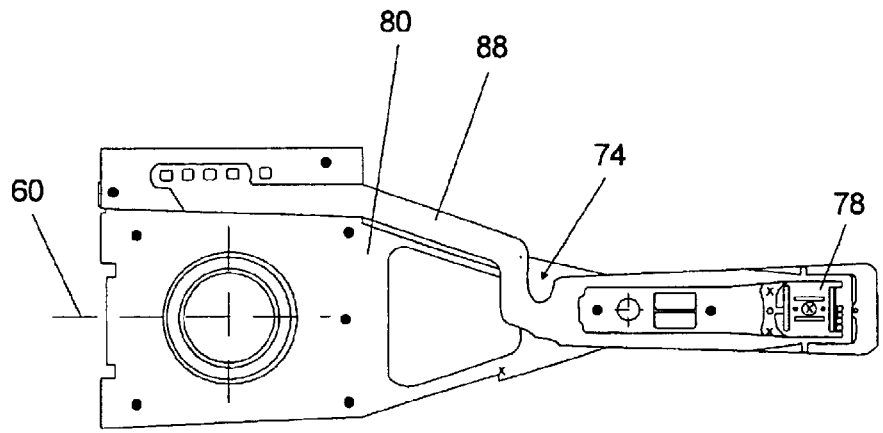
FIG. 5A is a bottom view of a portion of the suspension assembly and a base plate having features of the present invention.
Figure 5B:
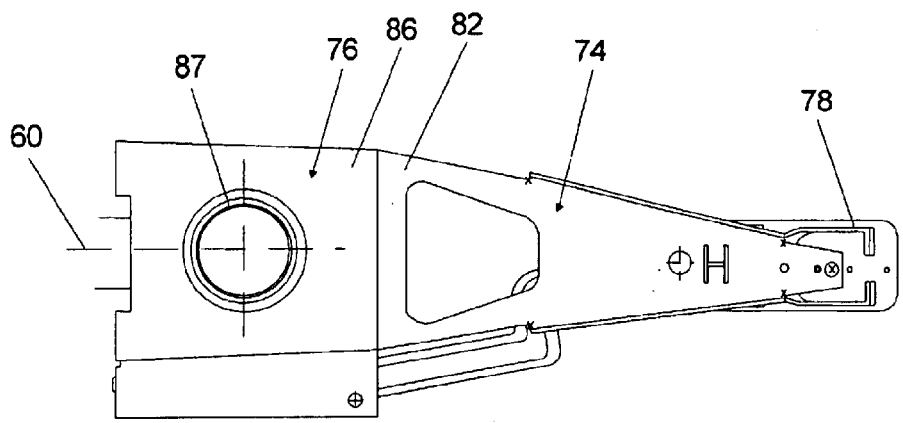
FIG. 5B is a top plan view of the suspension assembly and base plate of FIG. 5A.
Figure 5C:
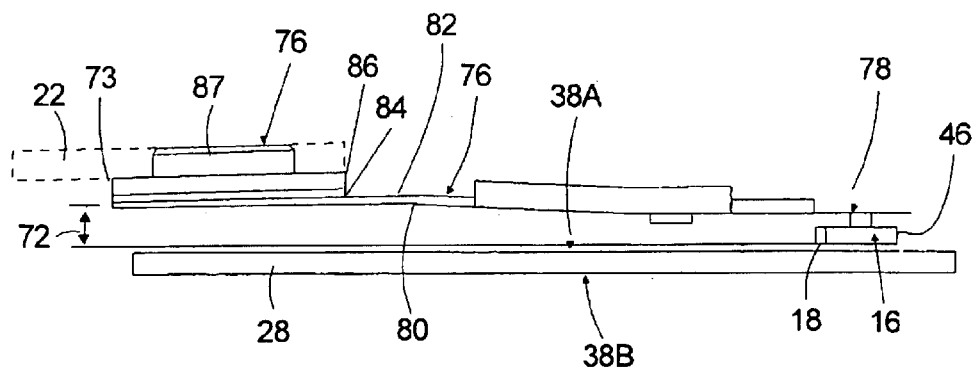
FIG. 5C is a side illustration of a portion of an actuator arm (illustrated in phantom), a base plate, load beam, transducer assembly and a portion of the disk assembly.

The transducer assembly 16 transfers or transmits information between the computer (not shown) or word processor (not shown) and the storage disks 28. Referring to FIG. 5C, each transducer assembly 16 includes a slider 46 and the data transducer 18. Each slider 46 couples one (1) data transducer 18 to one of the suspension assemblies 24. The data transducer 18 interacts with the storage surface 38 of one of the storage disks 28 to access information from, or transfer information to the storage disk 28. For a magnetic storage disk 28, the data transducer 18 is commonly referred to as a read/write head.

Figure 2:
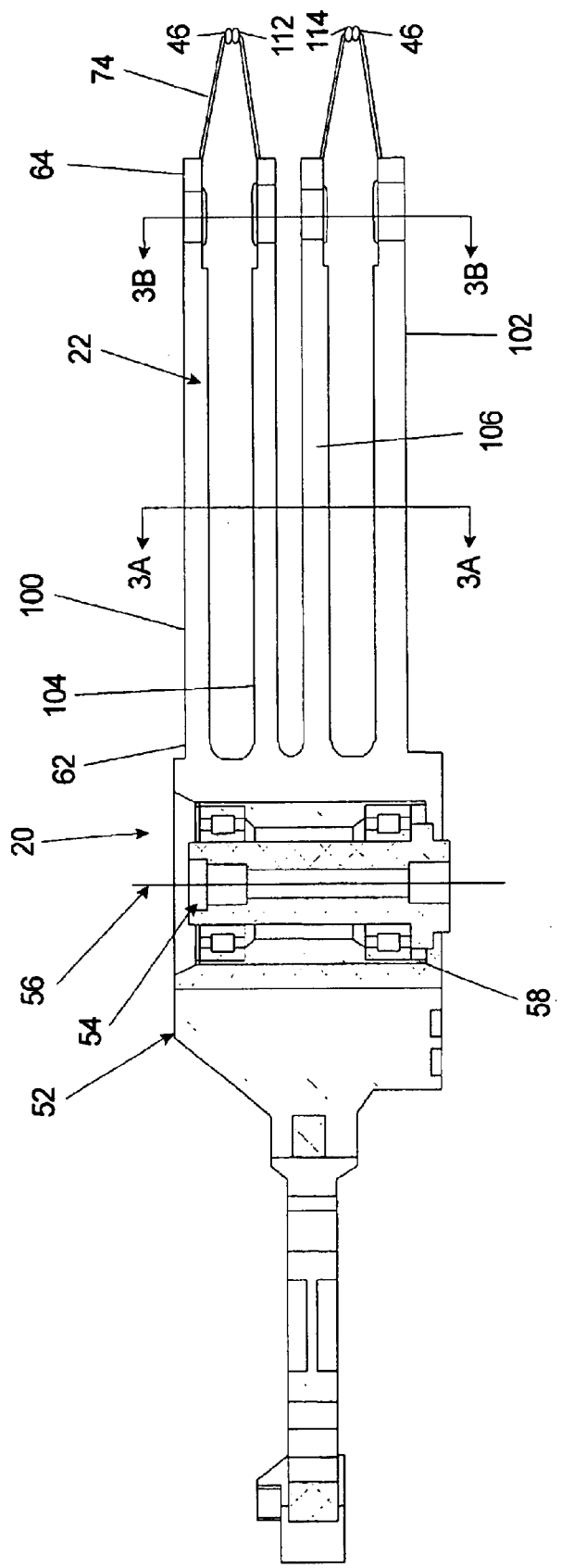
FIG. 2 is a side view, in partial cut-away, of a head stack assembly including a plurality of actuator arms having features of the present invention.

As can best be seen with reference to FIG. 2, the E-block 20 includes an actuator hub 52 and a plurality of substantially parallel actuator arms 22 that are attached to and cantilever from the actuator hub 52. In this embodiment, the actuator hub 52 is substantially tubular shaped and is mounted to an actuator shaft 54. The actuator hub 52 rotates on an E-block pivot axis 56 relative to the actuator shaft 54 on an actuator bearing assembly 58. The E-block 20 also includes a longitudinal axis 60 that is positioned along the actuator arms 22. The actuator arms 22 move with the actuator hub 52 and position the data transducers 18 between the storage disks 28, proximate the storage surfaces 38 for transfer of data to and/or from the storage disks 28.

Figure 3A:
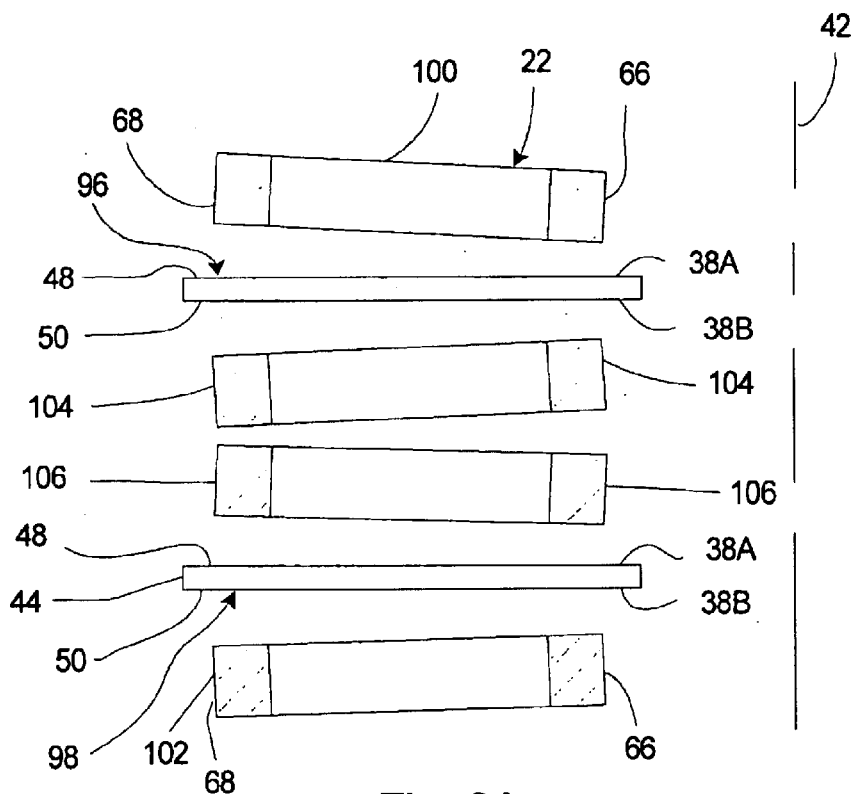
FIG. 3A is a cross-sectional view taken on line 3A—3A of FIG. 2, the actuator hub is not shown in FIG. 3A for clarity and a portion of a disk assembly and a disk axis have been added for reference.

The number of actuator arms 22 will vary accordingly to the number of storage disks 28. Each actuator arm 22 includes a proximal section 62 that is secured to the actuator hub 52 and a distal section 64 that cantilevers away from the actuator hub 52. Referring to FIG. 3A, each actuator arm 22 further includes a spindle side 66 that faces the disk spindle 40 and a perimeter side 68 that faces the disk perimeter 44. The spacing of the actuator arms 22 varies according to the spacing of the storage disks 28. The arm pitch of the actuator arms 22 is typically between approximately three and one-half millimeters (3.5 mm) to five and one-half millimeters (5.5 mm). The thickness of each actuator arm 22 is between approximately 0.9 millimeters and 1.5 millimeters. Further, the spacing between and thickness of each of the actuator arms 22 can vary within a given E-block 20, as illustrated in FIG. 2.

Referring to FIGS. 2, 3A–3D, one or more actuator arms 22 are formed with a roll-bias angle 70 having an absolute value of greater than zero degrees relative to the respective storage disk 28. Preferably, the roll-bias angle 70 provided below extends along the majority of the length of each actuator arm 22 and even more preferably along substantially the entire length of each actuator arm 22. Stated another way, the roll-bias angle 70 provided below extends at least approximately forty to fifty percent of the length of each actuator arm 22, and more preferably the roll-bias angle 70 extends at least approximately sixty to seventy-five percent of the length of each actuator arm 22 and even more preferably the roll-bias angle 70 extends at least approximately ninety to ninety-five percent of the length of each actuator arm 22.

Figure 3B:
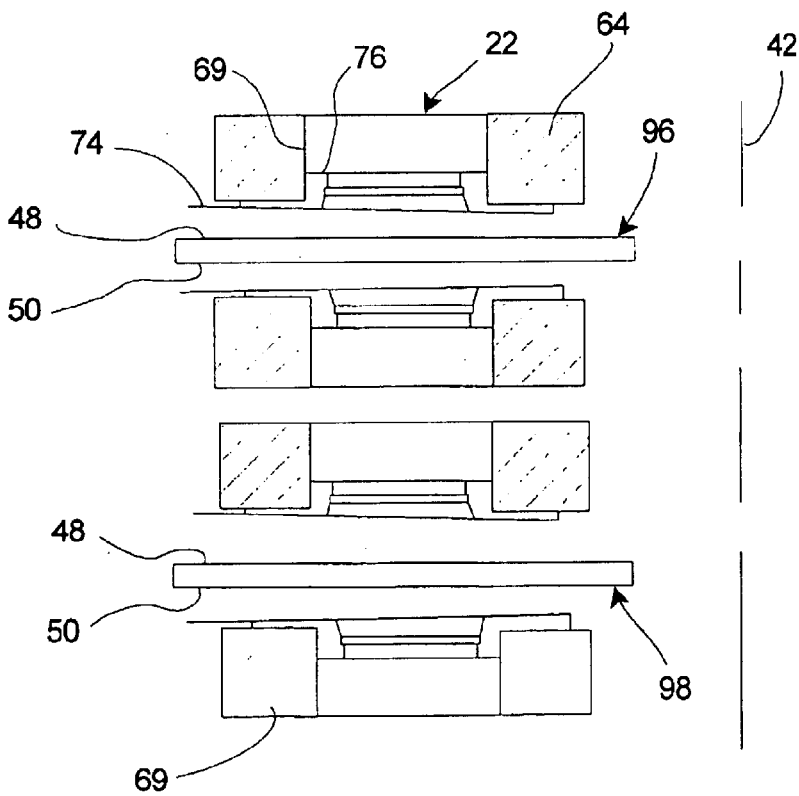
FIG. 3B is a cross-sectional view taken on line 3B—3B in FIG. 2, the actuator hub is not shown in FIG. 3B for clarity and a portion of the disk assembly and the disk axis have been added for reference.
Figure 3C:
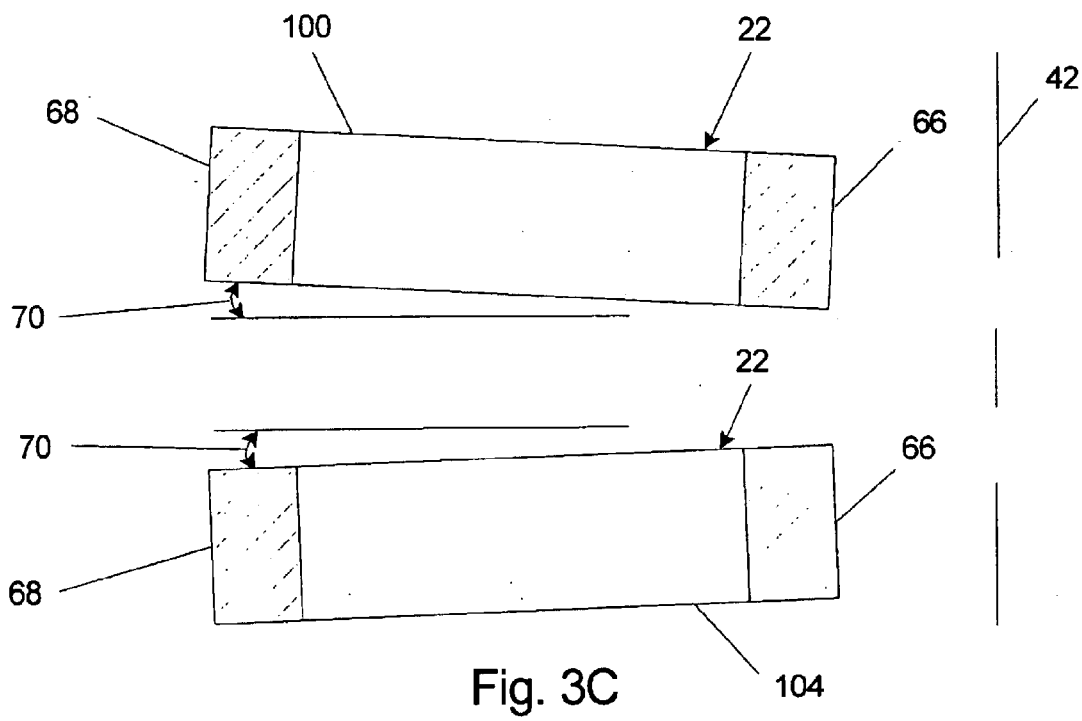
FIG. 3C is an enlarged view of a couple of the actuator arms from FIG. 3A.
Figure 3D:
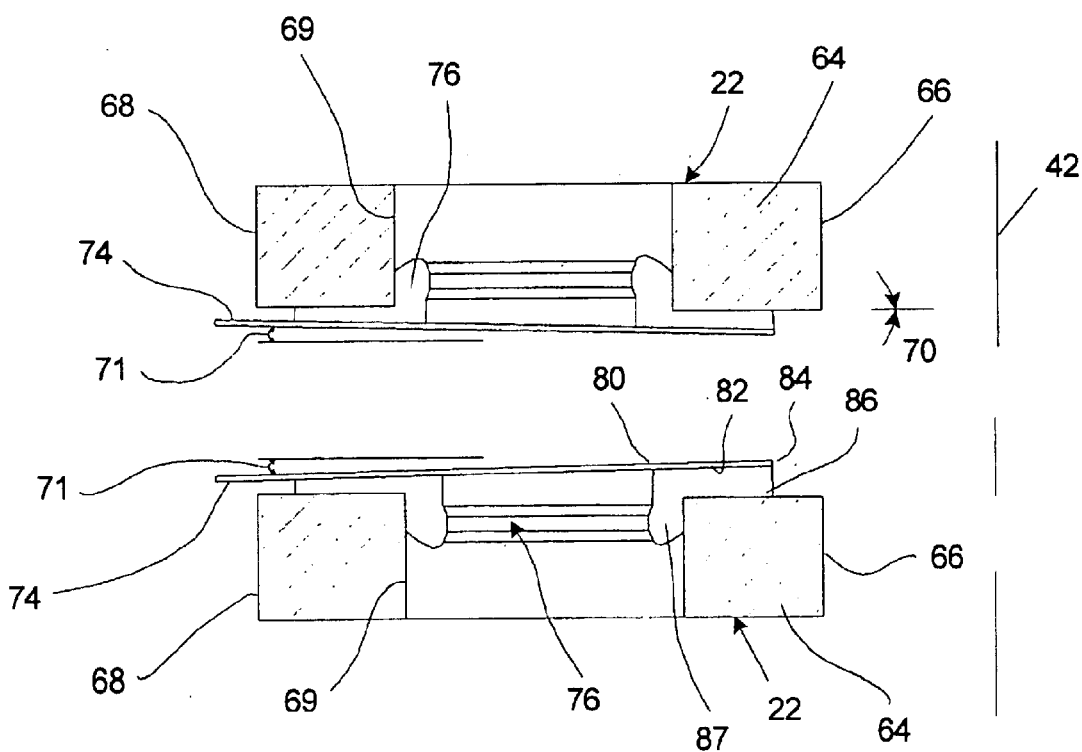
FIG. 3D is an enlarged view of a couple of the actuator arms from FIG. 3B.

Typically, referring to FIGS. 3B and 3D, the distal section 64 of each actuator arm 22 includes a mounting aperture 69 for securing the transducer assembly 16 to the actuator arm 22. Preferably, referring to FIGS. 3B and 3D, the distal section 64 of each actuator arm 22 is parallel to the respective storage disk 28 and has a roll-bias angle 70 of approximately zero degrees. This design facilitates the swaging of the respective suspension assembly 24 to the actuator arm 22. Thus, each actuator arm 22 is rolled from the proximal section 62 to near the distal section 64. However, distal section 64 is not rolled.

Referring to FIGS. 3A and 3C, as used herein, a negative roll-bias angle 70 indicates the actuator arm 22 is "tilted" or rolled in the direction of the disk axis 42 and the disk spindle 40 (not shown in FIGS. 3A and 3C). In other words, the spindle side 66 of the actuator arm 22 is closer to the storage disk 28 than the perimeter side 68 of the actuator arm 22. A positive roll-bias angle 70 indicates the actuator arm 22 is rolled in the direction of the disk perimeter 44.

As provided above, the roll bias angle 70 of the actuator arms 22 has an absolute value of greater than zero degrees. The roll-bias angle 70 is preferably between approximately positive two (+2) and negative two (−2) degrees from zero relative to the respective storage disk 28. More preferably, the roll-bias angle 70 of each actuator arm 22 is between approximately negative 1.5 (−1.5) degrees to negative 1.8 (−1.8) degrees from zero relative to the respective storage disk 28. Most preferably, the roll-bias angle 70 of each actuator arm 22 is approximately negative 1.6 (−1.6) degrees from zero relative to the respective storage disk 28. FIGS. 3A–3C illustrate that each actuator arm 22 can have an angle 70.

Importantly, the negative roll bias angle of the actuator arms 22 minimize the influence of bending of the actuator arms 22 and reduce off track motion of the data transducers 18 due to vibrations of the disk assembly 14, the actuator arms 22 and the suspension assemblies 24. This allows for more accurate positioning of the data transducers 18 and more accurate data transfers.

Preferably, the roll-bias angle 70 of each actuator arm 22 is translated to the suspension assembly 24 and the data transducer 18 coupled to each such actuator arm 22. Stated another way, the suspension assembly 24 and the data transducer 18 secured to each actuator arm 22 are preferably substantially parallel with, coplanar, and maintained at the same roll-bias angle 70 as the actuator arm 22. Thus, preferably, the suspension assembly 24 and the data transducer 18 are maintained at a roll-bias angle 71 of between approximately negative 1.5 (−1.5) degrees and negative 1.8 (−1.8) degrees and even more preferably at approximately negative 1.6 (−1.6) degrees relative to the respective storage disk 28. U.S. Pat. No. 6,088,192 discusses the advantages to utilizing a roll-bias angle on the suspension assembly 24.

Further, as illustrated in FIG. 3A, two actuator arms 22 are positioned between adjacent storage disks 28. Stated another way, the E-block 20 includes a separate actuator arm 22 for each storage surface 38A, 38B of each storage disk 28. This design allows each of the actuator arms 22 to be designed and positioned to have the appropriate roll-bias angle 70 for the respective storage disk 28. This design is particularly useful for disk drives having a three and one-half inch or larger diameter storage disks 28.

During operation of the disk drive 10, the actuator mover 25 rotates the actuator hub 52 and moves the actuator arms 22 relative to the storage disks 28. The actuator mover 25 can be configured and designed in various ways known to those skilled in the art. For example, the actuator mover 25 can rotate the E-block or move the E-block linearly. In the embodiment illustrated in FIG. 1, the actuator mover 25 rotates the E-block 20 about the E-block pivot axis 56. In this embodiment, the actuator mover 25 includes a magnet assembly (not shown) and a conductor assembly (not shown).

Many processes can be used to make the E-block 20. For example, the E-block 20 could be extruded and machined to the proper dimensions. Alternately, the E-block 20 could be injection molded or cast. Suitable materials for the E-block 20 are an aluminum alloy, a magnesium alloy, reinforced plastic, or a ceramic material, although other suitable materials can be used.

In the embodiments provided herein, each suspension assembly 24 supports one (1) transducer assembly 16. Referring to FIGS. 5A–5C, the suspension assembly 24 includes a load beam 74, and a flexure 78. The load beam 74 attaches the flexure 78 and the transducer assembly 16 to the E-block 20. Typically, each load beam 74 is flexible in a direction perpendicular to the storage disk 28 and acts as a spring for supporting the data transducer 18. Each load beam 74 includes a first beam surface 80 and a second beam surface 82. The first beam surface 80 faces the adjacent storage disk 28, while the second beam surface 82 is opposite from the first beam surface 80.

Each flexure 78 is used to attach one (1) transducer assembly 16 to one (1) of the load beams 74. Typically, each flexure 78 includes a plurality of conductive flexure traces 88 that are electrically connected to the data transducer 18 of each transducer assembly 16. Each flexure 78 is subsequently attached to a flex circuit (not shown) that electrically connects the flexures 78 to the disk drive 10.

Figure 5D:
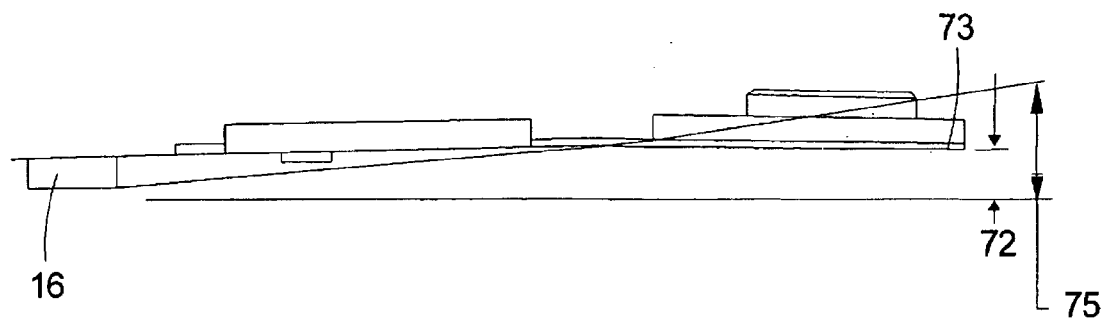
FIGS. 5D–5F each illustrate alternate embodiments of the suspension assembly.
Figure 5E:
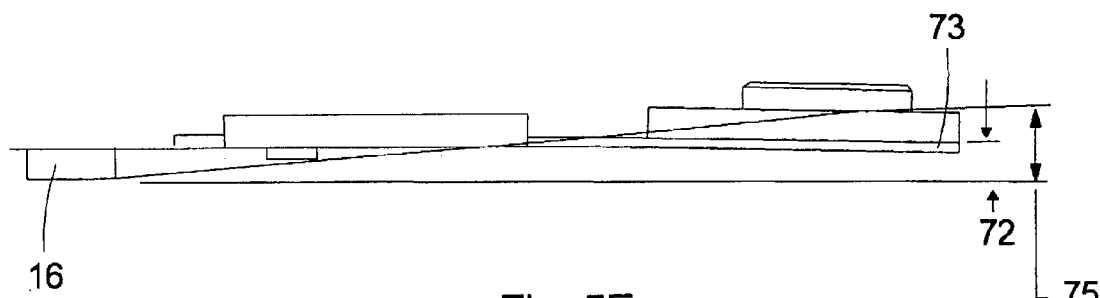
Figure 5F:
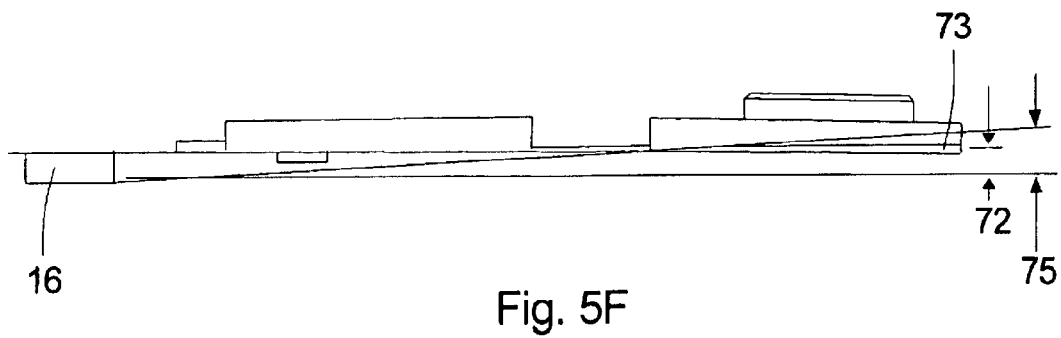

Referring to FIGS. 5C and 5D–5F, a suspension z-height 72 associated with a given actuator arm 22 and suspension assembly 24, is defined as the distance between a mounting surface 73 of the suspension assembly (in some embodiments, the second beam surface 82 of the load beam 74) and the bottom of the transducer assembly 16 when the transducer assembly 16 is flying above the storage disk 28. Preferably, the suspension z-height 72 for each of the suspension assemblies is reduced and adjusted to minimize the track misregistration coupling induced vibration due to the arm bending mode at all skew angles. For a suspension assembly 24 having a length of approximately eleven millimeters, preferably the suspension z-height 72 for each of the suspension assemblies 24 is between approximately 0.40–0.65 millimeters. More preferably, the suspension z-height 72 for each of the suspension assemblies 24 is approximately 0.52 millimeters for a 11 mm suspension assembly 24. FIGS. 5D–5F each illustrate an alternative embodiment of 11 mm suspension assemblies 24. More specifically, FIG. 5D illustrates a suspension assembly 24 having at a suspension z-height 72 of approximately 0.67 mm. Further, the suspension assembly 24 is at a suspension angle 75 of approximately 4.53 degrees. FIG. 5E illustrates a suspension assembly 24 having a suspension z-height 72 of approximately 0.47 mm and a suspension angle 75 of approximately 3.18 degrees. Further, FIG. 5F illustrates a suspension assembly 24 at a suspension z-height 72 of approximately 0.27 mm and a suspension angle 75 of approximately 1.83 degrees.

Alternately, the preferred suspension z-height will be different for suspension assemblies 24 that are longer or shorter than 11 mm. Those skilled in the art with the teaching provided herein will be able to optimize the suspension z-height for different length suspension assemblies 24.

Importantly, the suspension z-height 72 of the suspension assemblies 24 provided herein flattens the angle of the suspension assembly 24 and decreases track misregistration when the data transducer 18 is positioned at all skew angles, from the outside diameter 26 of the storage disk 28 to an inside diameter 30 of the storage disk 28. More specifically, the lower suspension z-height 72 of the suspension assembly reduces off track motion due to disk bending, reduces outer diameter to inner diameter sensitivity to skew angle and minimizes coupling of all the actuator arm bending modes. Stated another way, the lower suspension z-height 72 affects the skew sensitivity to the first arm bending coupling and the disk mode coupling and reduces the track misregistration in one direction of skew to zero.

As provided herein, the arm mode sensitivity plot is approximately zero coupling at a zero skew angle, however, the disk mode coupling is at approximately 3.8% coupling at zero skew angle. Thus, adjusting the suspension z-height 72 alone will not completely eliminate the track misregistration of the disk modes. Preferably, the head stack assembly 15 includes both the unique actuator arm 22 shape and the improved z-height of the suspension assembly 24 to decrease off track motion.

In the embodiments illustrated herein, a base plate 76 secures the suspension assembly 24 to the actuator arm 22. The base plate 76 includes a beam mount area 84, a plate mount area 86, and a plate hub area 87. The beam mount area 84 is secured to the load beam 74, and the plate mount area 86 is secured to the actuator arm 22. The plate hub area 87 further assists in securing the base plate 76 to the actuator arm 22. FIG. 3D is a cross-sectional view that illustrates that the base plate 76 is angled. With this design, the base plate 76 facilitates positioning the suspension assembly 24 at the appropriate roll bias angle 71. Further, this design of the base plate 76 allows the distal section of each actuator arm 22 to be parallel with the respective storage disk 28.

More specifically, FIG. 5C illustrates a unique configuration of the base plate 76 and the load beam 74 wherein the second beam surface 82 of the load beam 74 is bonded to, or otherwise secured to, the beam mount area 84 of the base plate 76. Preferably, the plate mount area 86 faces a direction generally opposite that of the storage disk 28. Stated another way, the mounting surface 73 of the suspension assembly 24 is the bottom of the base plate 76. Because of this design, the second beam surface 82 of the load beam 74 is closer to the storage disk 28 by the thickness of the base plate 76. The base plate 76 thickness is normally within the range of approximately 0.10–0.30 millimeters, and is typically about 0.20 millimeters. Thus, this embodiment provides a z-height 72 that is approximately 0.20 millimeters less than a design that includes the second beam surface 82 of the load beam 74 being mounted to the plate mount area 86 of the base plate 76. As explained below, by reducing the z-height 72, sensitivity of the disk drive 10 to track misregistration is decreased.

Alternatively, the first beam surface 80 of the load beam 74 can be secured to the plate mount area 86 so that the load beam 74 is positioned substantially between the actuator arm 22 and the base plate 76. In this design, the actuator arms 22 are designed relative to the storage disks 28 to obtain the desired suspension z-height 72 of the suspension assembly 24. The methods of reducing suspension z-height 72 as provided herein are in no way intended to limit the scope of the present invention. Additional methods of reducing suspension z-height 72 to the appropriate distance can be implemented.

FIG. 2 illustrates an E-block 20 that includes four spaced apart actuator arms 22 having features of the present invention. In this embodiment, the uppermost actuator arm 22 is referred to as the top actuator arm 100, while the lowermost actuator arm is designated the bottom actuator arm 102. Further, the two remaining actuator arms 22 positioned between the storage disks 28 shall be referred to as the first actuator arm 104 and the second actuator arm 106, respectively, from upper to lower, on FIG. 2. Alternatively, any of the actuator arms 22 can be referred to as the first actuator arm or the second actuator arm. Referring to FIGS. 3A and 3B, for this embodiment, the storage disk 28 that is uppermost is referred to as a first storage disk 96 and the storage disk 28 that is lowermost is referred to as a second storage disk 98.

Preferably, the first and second actuator arms 104, 106, at least partially extend between the first storage disk 96 and the spaced apart, adjacent, second storage disk 98, as indicated by FIGS. 3A and 3B. Importantly, by positioning the first and second actuator arms 104, 106, between the first and second adjacent storage disks 96, 98, the roll-bias angle 70 and the suspension z-height 72 for each arm can be optimized. In this embodiment, the first actuator arm 104 is coupled to a first suspension assembly and a first data transducer 112 for interaction with the bottom surface 50 of the first storage disk 96. The second actuator arm 106 is coupled to a second suspension assembly and a second data transducer 114 for interaction with the top surface 48 of the second storage disk 98.

A series of simulation analysis runs were performed to illustrate that having a roll-bias angle 70 over substantially the entire length of the actuator arm 22 caused a significant decoupling of the vibration modes of the actuator arms 22 from the vibration of the storage disks 28 to reduce track misregistration. FIGS. 6A–6H are graphs that outline the percentage of track misregistration coupling versus head skew at various suspension z-heights.

Figure 6A:
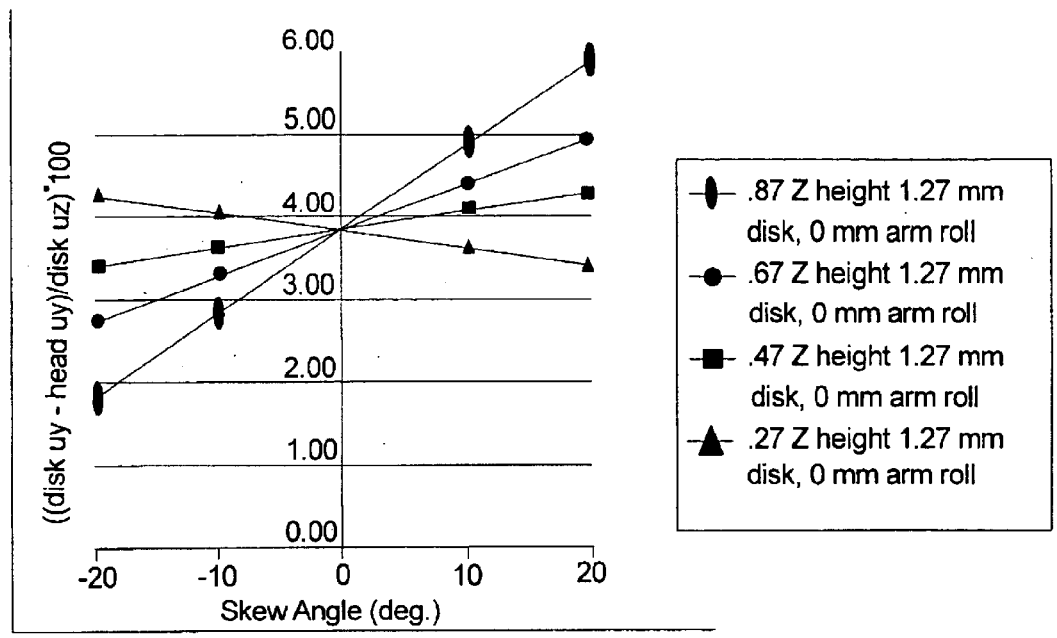
FIGS. 6A–6H each are graphs that outline the percentage of track misregistration coupling versus head skew at various z-heights of a data transducer for alternate actuator arm designs.

FIG. 6A provides the results of utilizing an actuator arm 22 with a roll-bias angle 70 of approximately zero degrees, imposed over substantially the entire length of the actuator arm 22. The graph illustrated in FIG. 6A shows that at a roll-bias angle 70 of approximately zero degrees, a z-height of between 0.67 and 0.47 millimeters minimized the influence of vibration of the head stack assembly 15 and the storage disks 28 on track misregistration in the first disk mode (0,1) (938.36 Hz).

Figure 6B:
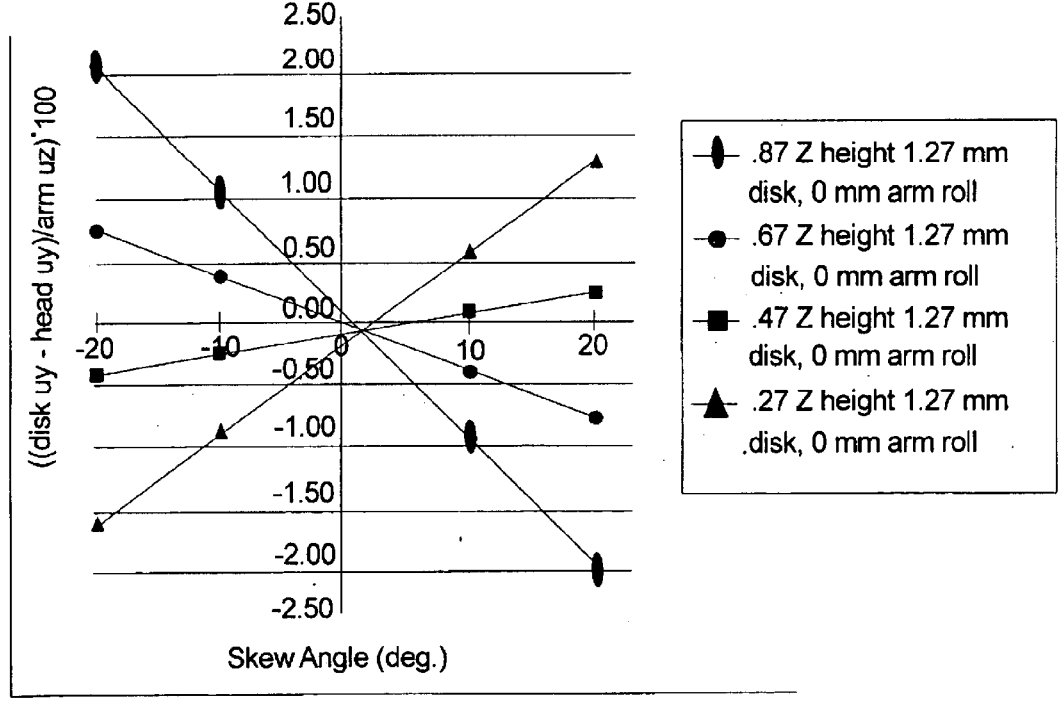

FIG. 6B provides the results of utilizing an actuator arm 22 with a roll-bias angle 70 of approximately zero degrees, imposed over substantially the entire length of the actuator arm 22. The graph illustrated in FIG. 6B shows that at a roll-bias angle 70 of approximately zero degrees, a z-height of between 0.67 and 0.47 millimeters minimized the influence of vibration of the head stack assembly 15 and the storage disks 28 on track misregistration in the first arm bending mode (1432.2 Hz).

Figure 6C:
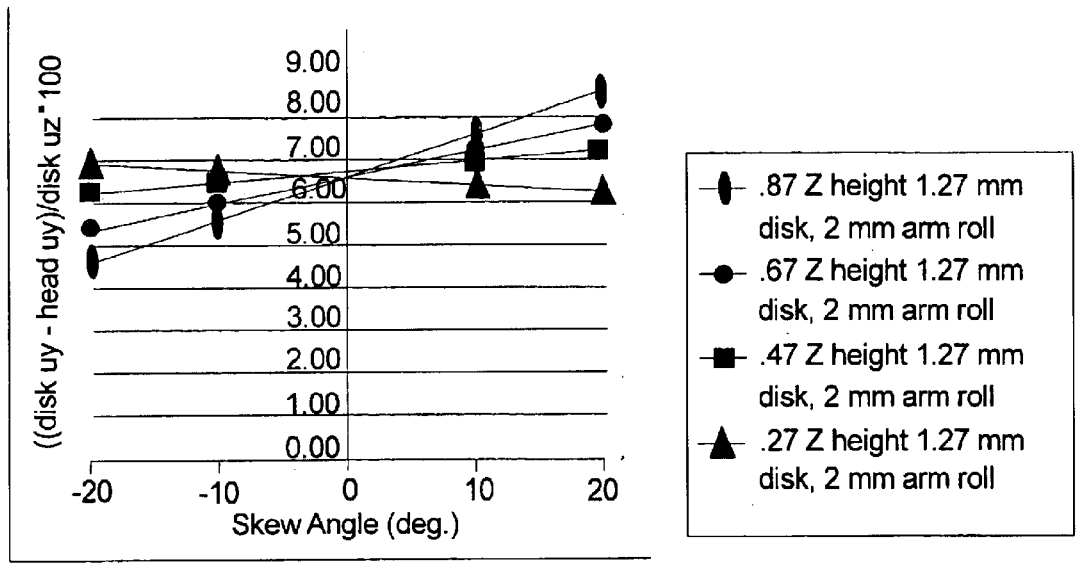

FIG. 6C provides the results of utilizing an actuator arm 22 with a roll-bias angle 70 of approximately +1.636 degrees, the equivalent of about +0.20 millimeters of roll, imposed over substantially the entire length of the actuator arm 22. The graph illustrated in FIG. 6C shows that at a roll-bias angle 70 of approximately +1.636 degrees, a z-height of between 0.67 and 0.47 millimeters minimized the influence of vibration of the head stack assembly 15 and the storage disks 28 on track misregistration in the first disk mode (0,1) (938.36 Hz).

Figure 6D:
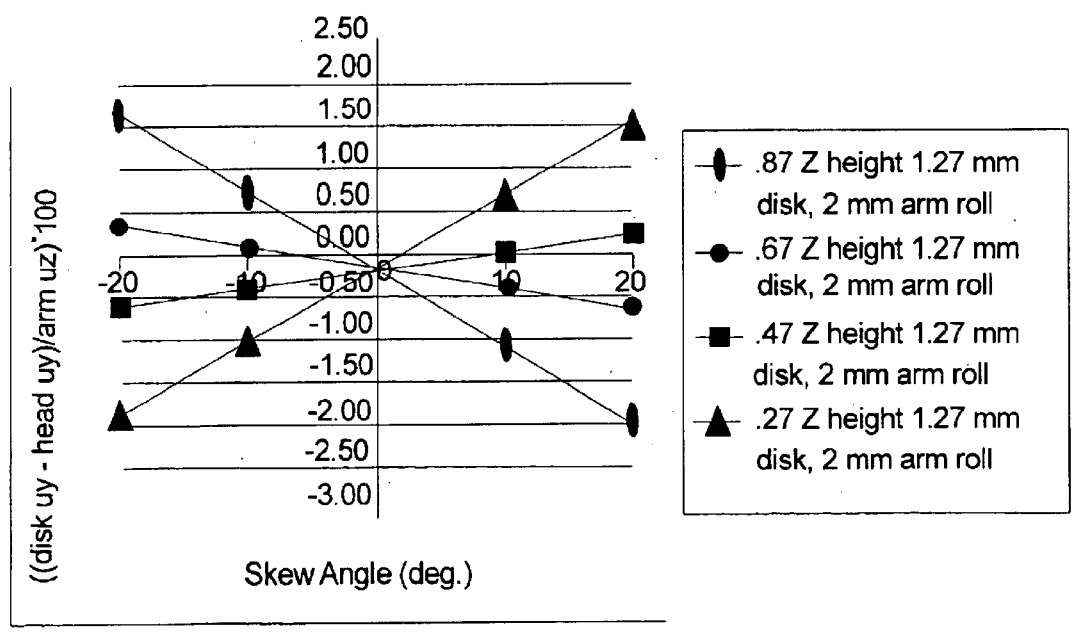

FIG. 6D provides the results of utilizing an actuator arm 22 with a roll-bias angle 70 of approximately +1.636 degrees, the equivalent of about +0.20 millimeters of roll, imposed over substantially the entire length of the actuator arm 22. The graph illustrated in FIG. 6D shows that the roll-bias angle 70 of approximately +1.636 degrees and a z-height of between 0.67 and 0.47 millimeters minimized the influence of vibration of the head stack assembly 15 and the storage disks 28 on track misregistration in the first arm bending mode (1432.2 Hz).

Figure 6E:
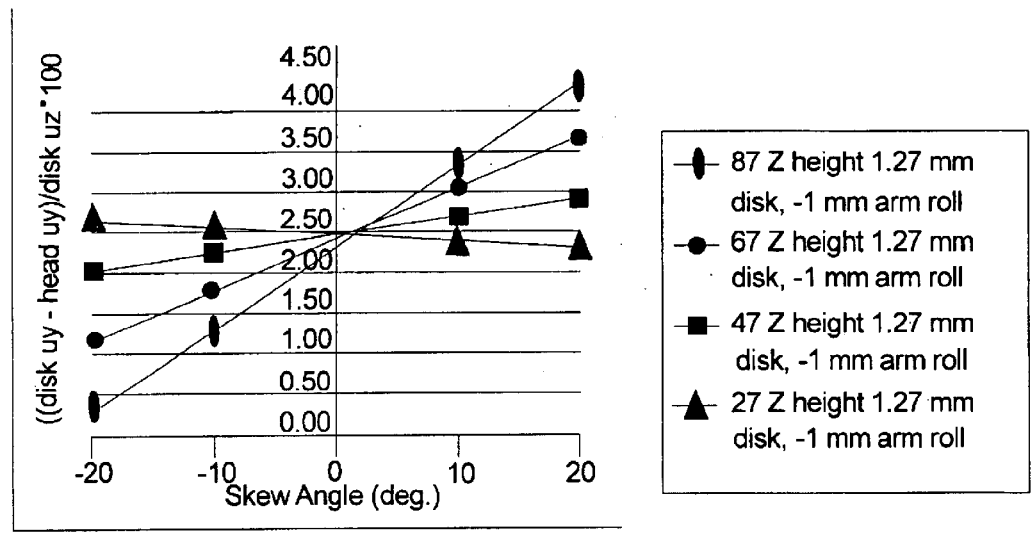

FIG. 6E provides the results of utilizing an actuator arm 22 with a roll-bias angle 70 of approximately −0.818 degrees, the equivalent of about −0.10 millimeters of roll, imposed over substantially the entire length of the actuator arm 22. The graph illustrated in FIG. 6E shows that the roll-bias angle 70 of approximately −0.818 degrees and a z-height of between 0.67 and 0.47 millimeters minimized the influence of vibration of the head stack assembly 15 and the storage disks 28 on track misregistration in the first disk mode (0,1) (938.36 Hz).

Figure 6F:
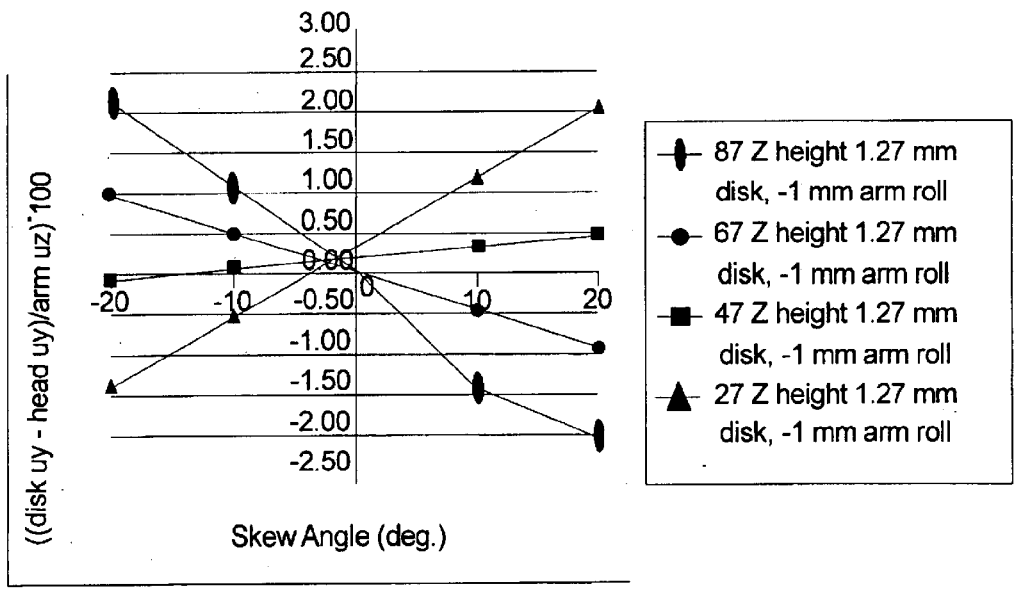

FIG. 6F provides the results of utilizing an actuator arm 22 with a roll-bias angle 70 of approximately −0.818 degrees, the equivalent of about −0.10 millimeters of roll, imposed over substantially the entire length of the actuator arm 22. The graph illustrated in FIG. 6F shows that the roll-bias angle 70 of approximately −0.818 degrees and a z-height of between 0.67 and 0.47 millimeters minimized the influence of vibration of the head stack assembly 15 and the storage disks 28 on track misregistration in the first arm bending mode (1432.3 Hz).

Figure 6G:
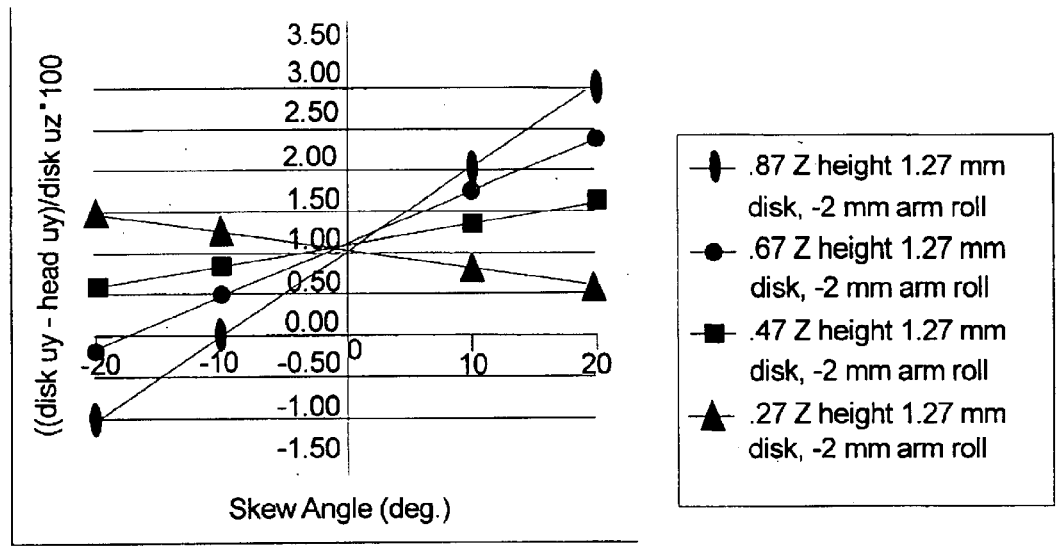

FIG. 6G provides the results of utilizing an actuator arm 22 with a roll-bias angle 70 of approximately −1.636 degrees, the equivalent of about −0.20 millimeters of roll, imposed over substantially the entire length of the actuator arm 22. The graph illustrated in FIG. 6G shows that the roll-bias angle 70 of approximately −1.636 degrees and a z-height of between 0.67 and 0.47 millimeters minimized the influence of vibration of the head stack assembly 15 and the storage disks 28 on track misregistration in the first disk mode (0,1) (938.36 Hz).

Figure 6H:
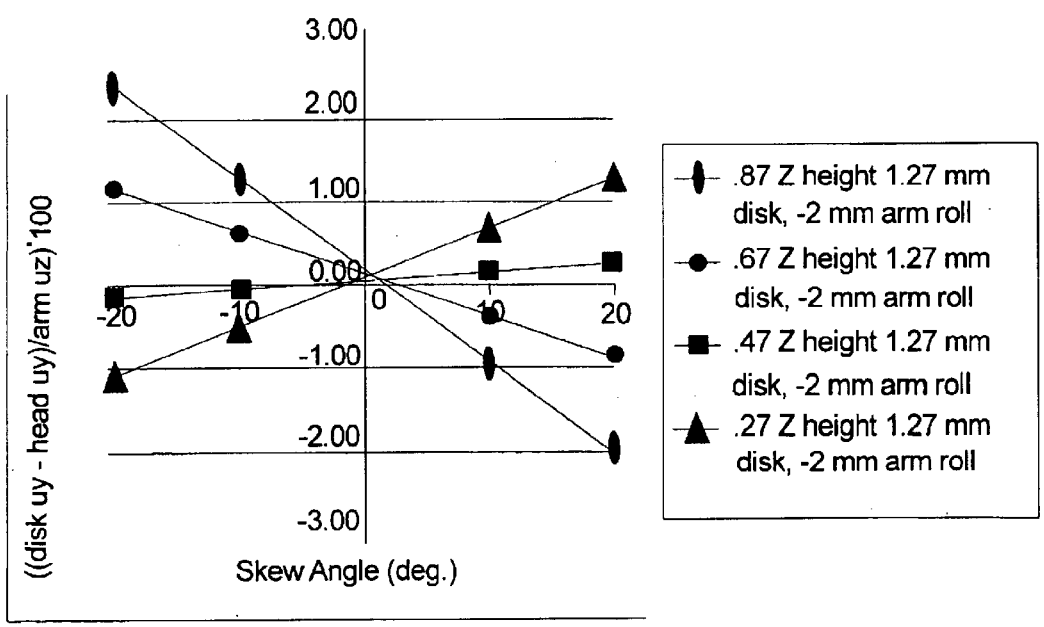

FIG. 6H provides the results of utilizing an actuator arm 22 with a roll-bias angle 70 of approximately −1.636 degrees, the equivalent of about −0.20 millimeters of roll, imposed over substantially the entire length of the actuator arm 22. The graph illustrated in FIG. 6G shows that the roll-bias angle 70 of approximately −1.636 degrees and a z-height of between 0.67 and 0.47 millimeters minimized the influence of vibration of the head stack assembly 15 and the storage disks 28 on track misregistration in the first arm bending mode (1432.2 Hz).

The graphs in FIGS. 6A–6G illustrate that four different z-heights 72 were analyzed (0.27 mm, 0.47 mm, 0.67 mm, and 0.87 mm), yielding four different curves. The optimum z-height 72 is determined by interpolating the four curves on the graph to establish the z-height 72 that provides a substantially horizontal line at or near the line y=0, i.e. little or no off-track motion due to bending of the storage disk 28 across the storage surface 38.

Referring now to FIGS. 4, 7A, 7B, 8A and 8B, experimentation was performed to illustrate how non-repeatable run-out was influenced by changes in suspension z-height 72. Non-repeatable run-out is used in this experiment as an indication of track misregistration.

Figure 4:
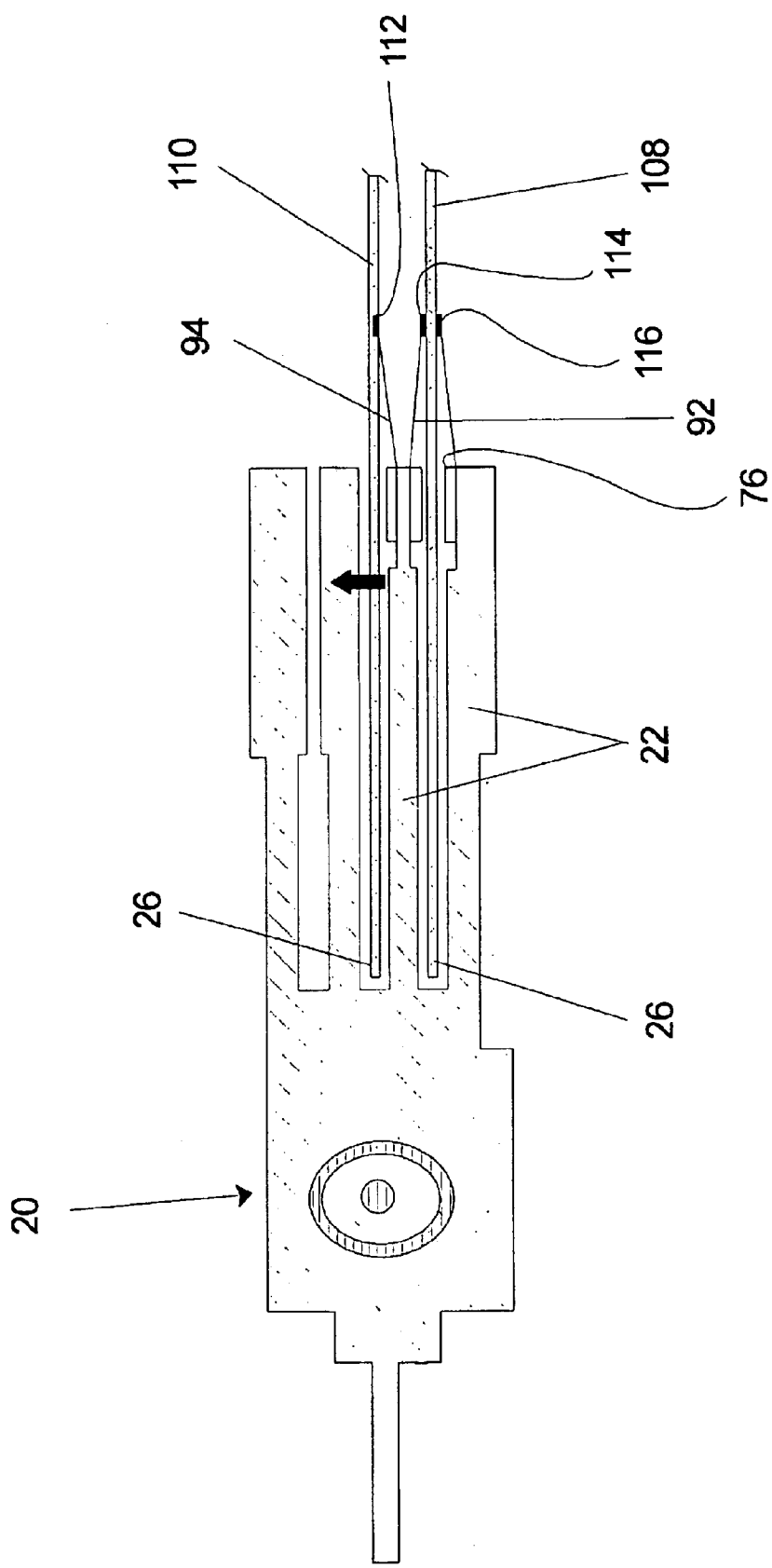
FIG. 4 is a side plan illustration of a portion of a head stack assembly and a portion of a disk assembly.

More specifically, FIG. 4 illustrates an E-block 20 and a pair of storage disks 28. In the embodiment illustrated in FIG. 4, the actuator arms 22 have no roll-bias angle 70. Thus, a single actuator arm 22 can be positioned between adjacent storage disks 28. Non-repeatable run-out results were obtained using the actuator arm 22 with an attached lower suspension assembly 92 and a similarly attached upper suspension assembly 94, with the lower and upper suspension assemblies 92, 94, being coupled to a data transducer 18.

Figure 7A:
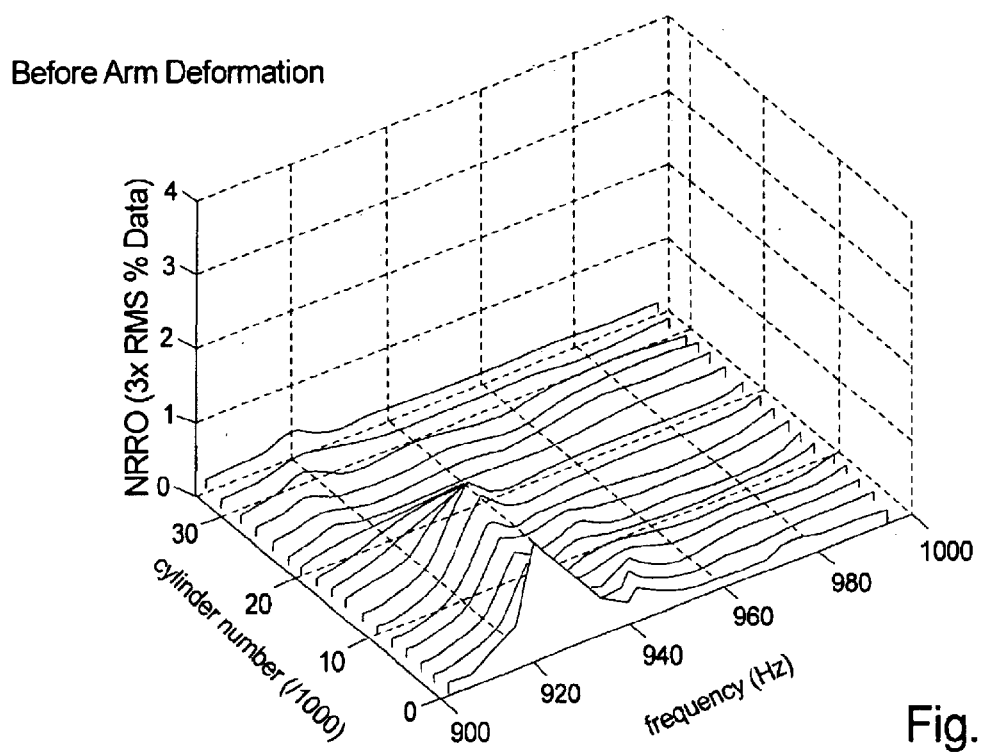
FIG. 7A is a graph illustrating experimental data regarding non-repeatable run-out versus frequency for a first data transducer prior to deformation of the first actuator arm.
Figure 7B:
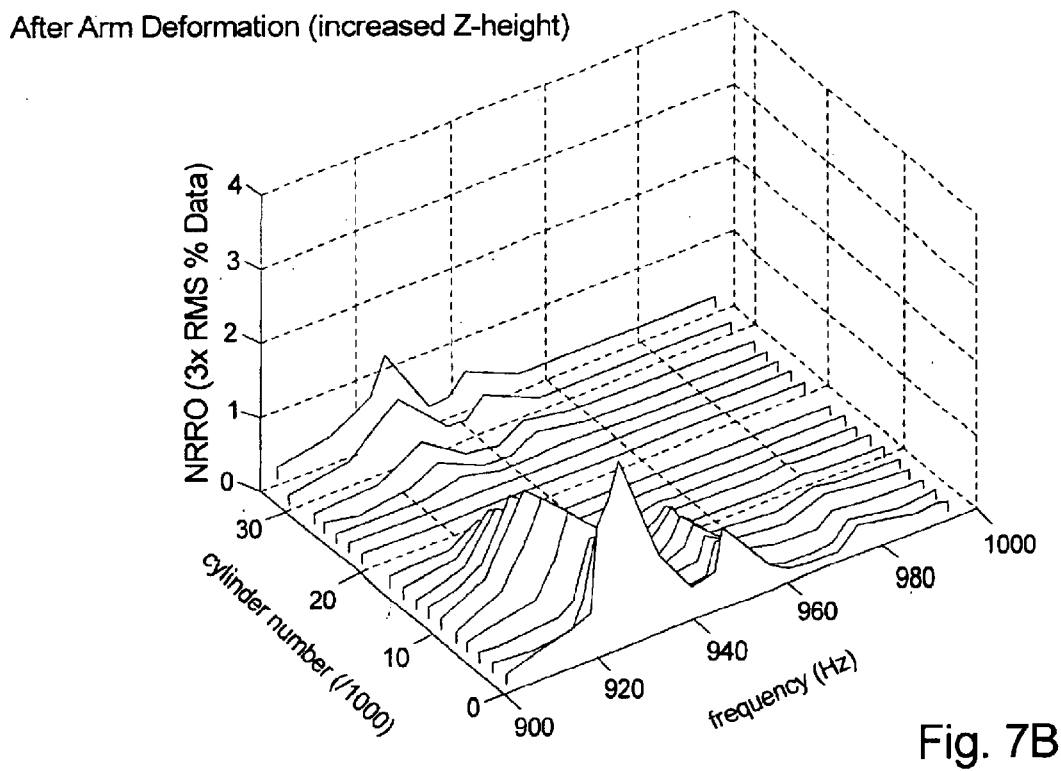
FIG. 7B is a graph illustrating experimental data regarding non-repeatable run-out versus frequency for the first data transducer following deformation of the first actuator arm.
Figure 8A:
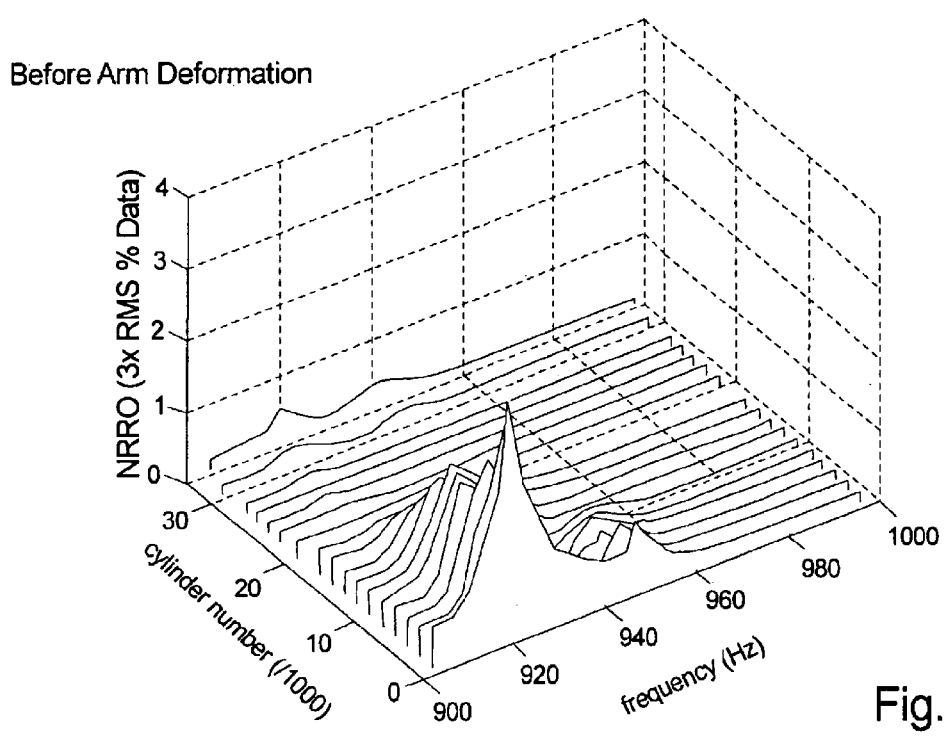
FIG. 8A is a graph illustrating experimental data regarding non-repeatable run-out versus frequency for a second data transducer prior to deformation of the first actuator arm.
Figure 8B:
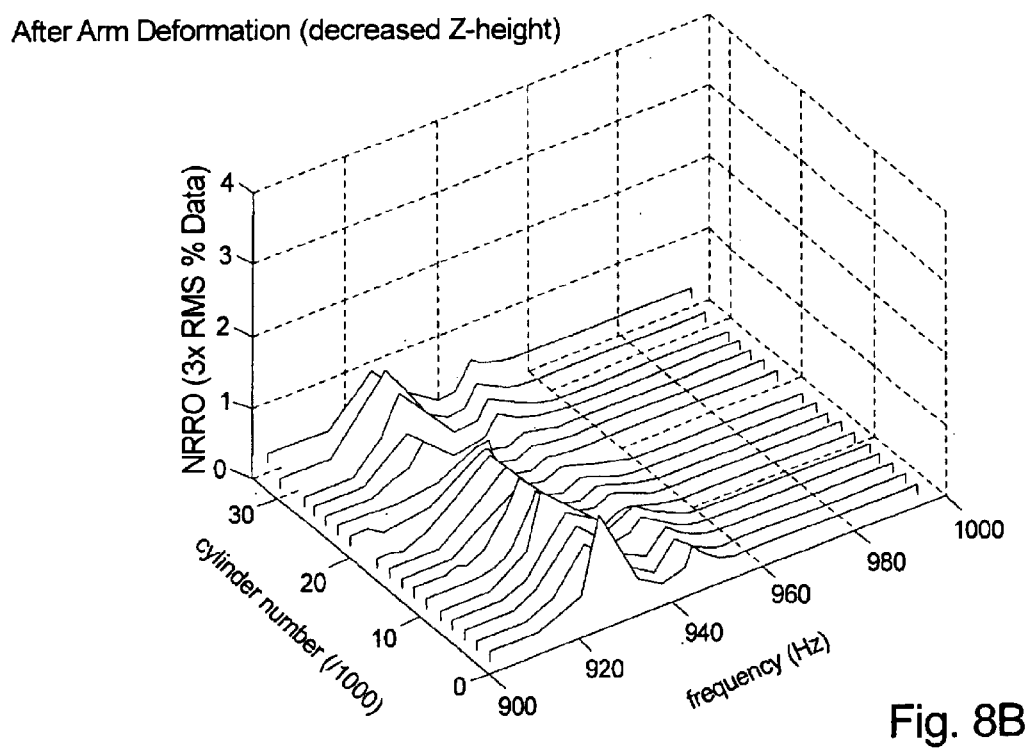
FIG. 8B is a graph illustrating experimental data regarding non-repeatable run-out versus frequency for the second data transducer following deformation of the first actuator arm.

FIGS. 7A and 8A are graphs that illustrate non-repeatable run-out measured at various cylinder locations (not shown) on the lower storage disk 108 and the upper storage disk 110, respectively, throughout the stroke of the actuator arm 22, i.e. from cylinder 0 outer diameter 26 through cylinder 32,000 inner diameter 30. FIG. 7A provides the results for the upper, first data transducer 112, and FIG. 8A shows the results for the lower, second data transducer 114. The actuator arm 22 was then deformed toward the upper storage disk 110 so that the suspension z-height 72 for the upper, first data transducer 112 was increased, and the suspension z-height 72 for the lower, second data transducer 114 was decreased. Again, non-repeatable run-out was measured at cylinders 0 through 32,000. FIGS. 7B and 8B depict the results of non-repeatable run-out following actuator arm 22 deformation.

Comparing FIGS. 7A and 7B and FIGS. 8A and 8B, non-repeatable run-out generally increased as the suspension z-height 72 increased and non-repeatable run-out generally decreases with a decreased z-height 72. A bottom data transducer 116 (shown on FIG. 4) was used as a control to assist in confirming that no unintended changes in the drive non-repeatable run-out occurred following deformation of the actuator arm 22. FIGS. 7A–8B indicate that at an actuator arm 22 mode frequency of approximately 950 Hertz, non-repeatable run-out decreased with decreasing the suspension z-height 72. Additionally, non-repeatable run-out increased with an increase in suspension z-height 72 at the actuator arm mode frequency of 950 Hertz. Thus, the experiments confirm that decreasing the z-height 72 generally results in decreasing non-repeatable run-out, thereby reducing sensitivity of the disk drive 10 to track misregistration.

While the particular E-block 20 and disk drive 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An E-block for use with a disk drive, the disk drive including a rotatable first storage disk and a first data transducer that interacts with the first storage disk, the E-block comprising:

an actuator hub; and a first actuator arm that extends away from the actuator hub and maintains the first data transducer near the first storage disk, the first actuator arm having a roll-bias angle along the majority of the length of the first actuator arm that is between approximately negative 1.5 degrees and negative 1.8 degrees relative to the first storage disk.

2. An E-block for use with a disk drive, the disk drive including a rotatable first storage disk and a first data transducer that interacts with the first storage disk, the E-block comprising:

an actuator hub;

a first actuator arm that extends away from the actuator hub and maintains the first data transducer near the first storage disk, the first actuator arm having a roll-bias angle along the majority of the length of the first actuator arm, the roll bias angle having an absolute value of greater than zero degrees relative to the first storage disk; and a second actuator arm that extends away from the actuator hub, the second actuator arm maintaining a second data transducer near a second storage disk, the second storage disk being positioned adjacent to the first storage disk, the second actuator arm having a roll-bias angle along the majority of the length of the second actuator arm, the roll bias angle having an absolute value of greater than zero degrees relative to the second storage disk;

wherein the first actuator arm and the second actuator arm are adapted to be positioned between the first storage disk and the second storage disk.

3. An E-block for a disk drive, the disk drive including a rotatable first storage disk, a spaced apart, adjacent, rotatable second storage disk, a first data transducer that interacts with the first storage disk and a second data transducer that interacts with the second storage disk, each storage disk having a top surface and a bottom surface, the E-block comprising:

an actuator hub;

a first actuator arm secured to the actuator hub, the first actuator arm maintaining the first data transducer near the bottom surface of the first storage disk and between the first storage disk and the second storage disk; and a second actuator arm secured to the actuator hub, the second actuator arm maintaining the second data transducer near the top surface of the second storage disk and between the first storage disk and the second storage disk the first and second actuator arms being formed as a unitary structure.

4. The E-block of claim 3 wherein the first actuator arm has a roll-bias angle along the majority of the length of the first actuator arm, the roll bias angle having an absolute value of greater than zero degrees relative to the bottom surface of the first storage disk.

5. The E-block of claim 4 wherein the second actuator arm has a roll-bias angle along the majority of the length of the second actuator arm, the roll bias angle having an absolute value of greater than zero degrees relative to the top surface of the second storage disk.

6. The E-block of claim 5 wherein the roll-bias angle occurs substantially over the entire length of the first and second actuator arms.

7. The E-block of claim 3 wherein a spacing between the first actuator arm and the second actuator arm remains substantially constant along a portion of the length of the actuator arms.

8. The E-block of claim 3 wherein a spacing between the first actuator arm and the second actuator arm remains substantially constant along a majority of the length of the actuator arms.

9. The E-block of claim 3 wherein a spacing between the first actuator arm and the second actuator arm remains constant along substantially the entire length of the actuator arms.

10. A disk drive comprising:

a drive housing;

a storage disk that is rotatably coupled to the drive housing;

a data transducer;

an E-block including an actuator hub and a actuator arm that extends away from the actuator hub and maintains the data transducer near the storage disk, the actuator arm having a roll-bias angle along the majority of the length of the actuator arm, the roll bias angle having an absolute value of greater than zero degrees relative to the storage disk;

a suspension assembly that is coupled to the E-block, the suspension assembly supporting the data transducer, the suspension assembly including a mounting surface that generally faces away from the storage disk; and a base plate that secures the mounting surface to the E-block, the base plate including (i) a beam mount surface that engages the mounting surface of the suspension assembly, the beam mount surface substantially facing the storage disk, and (ii) a plate mount surface that is secured to the E-block, the plate mount surface facing in a direction that is substantially opposite the beam mount surface.

11. A disk drive comprising:

a drive housing;

a storage disk that is rotatably coupled to the drive housing;

a data transducer;

a suspension assembly that supports the data transducer, the suspension assembly including a mounting surface;

an actuator arm that extends away from the actuator hub and maintains the data transducer near the storage disk, the actuator arm having a roll-bias angle along the majority of the length of the actuator arm, the roll bias angle having an absolute value of greater than zero degrees relative to the storage disk; and a base plate that couples the mounting surface of the suspension assembly to a distal section of the actuator arm, the base plate being positioned substantially between the mounting surface and the distal section of the actuator arm.

12. A disk drive comprising:

a storage disk having an inner diameter and an outer diameter;

a data transducer that moves between the inner diameter and the outer diameter of the storage disk;

a suspension assembly that supports the data transducer, the suspension assembly including a mounting surface that faces generally away from the storage disk;

an actuator arm that supports the suspension assembly, the actuator arm having a roll-bias angle along at least a majority of the length of the actuator arm, the roll-bias angle having an absolute value of greater than zero degrees relative to the storage disk, the actuator arm maintaining the mounting surface at a suspension z-height that reduces vibration of the data transducer when the data transducer moves between the inner diameter and the outer diameter of the storage disk; and a base plate that couples the mounting surface of the suspension assembly to a distal section of the actuator arm, the base plate being positioned substantially between the mounting surface and the distal section of the actuator arm.

13. An E-block for a disk drive, the disk drive including a rotatable first storage disk, a spaced apart, adjacent, rotatable second storage disk, a first data transducer that interacts with the first storage disk and a second data transducer that interacts with the second storage disk, each storage disk having a top surface and a bottom surface, the E-block comprising:

an actuator hub;

a first actuator arm that maintains the first data transducer near the bottom surface of the first storage disk and between the first storage disk and the second storage disk, the first actuator arm having a roll-bias angle along the majority of the length of the first actuator arm that is between approximately negative 1.5 degrees and negative 1.8 degrees relative to the bottom surface of the first storage disk; and a second actuator arm that maintains the second data transducer near the top surface of the second storage disk and between the first storage disk and the second storage disk, the second actuator arm having a roll-bias angle along the majority of the length of the second actuator arm that is between approximately negative 1.5 degrees and negative 1.8 degrees relative to the top surface of the second storage disk.

14. A disk drive, comprising:

a drive housing;

a first storage disk that is rotatably coupled to the drive housing;

an actuator hub that is coupled to the drive housing;

a first data transducer;

a first actuator arm that extends away from the actuator hub and maintains the first data transducer near the first storage disk, the first actuator arm having a roll-bias angle along the majority of the length of the first actuator arm, the roll bias angle having an absolute value of greater than 0.1 degrees relative to the first storage disk.

15. The disk drive of claim 14 wherein the roll bias angle has an absolute value of greater than approximately 0.5 degrees.

16. The disk drive of claim 14 wherein the roll bias angle has an absolute value of greater than approximately 1.0 degree.

17. The disk drive of claim 14 wherein the first actuator arm has a roll-bias angle along substantially the entire length of the first actuator arm.

18. The disk drive of claim 14 wherein the first actuator arm has a roll-bias angle along at least approximately seventy-five percent of the length of the first actuator arm.

19. The disk drive of claim 14 further comprising a second actuator arm that extends away from the actuator hub, the second actuator arm maintaining a second data transducer near a second storage disk, the second storage disk being positioned adjacent to the first storage disk, the second actuator arm having a roll-bias angle along the majority of the length of the second actuator arm, the roll bias angle having an absolute value of greater than 0.1 degrees relative to the second storage disk.

20. The disk drive of claim 19 wherein the first actuator arm and the second actuator arm are positioned between the first storage disk and the second storage disk.

21. The disk drive of claim 14 further comprising a first base plate that secures a first suspension assembly to the first actuator arm, the first suspension assembly including an assembly mounting surface that engages the first base plate and secures the suspension assembly to the base plate, wherein the assembly mounting surface is positioned at a z-height of between approximately 0.40–0.65 millimeters away from a storage surface of the first storage disk.

22. The disk drive of claim 14 further comprising a first base plate that secures a first suspension assembly to the first actuator arm, the first suspension assembly including an assembly mounting surface that engages the first base plate and secures the suspension assembly to the base plate, wherein the assembly mounting surface is positioned at a z-height of less than approximately 0.45 millimeters away from a storage surface of the first storage disk.

23. The disk drive of claim 14 wherein the first actuator arm includes a distal section having a roll-bias angle of approximately zero degrees.

24. The disk drive of claim 14 further comprising a first suspension assembly that is supported by the first actuator arm, the first suspension assembly having a roll bias angle that is approximately equal to the roll bias angle of the first actuator arm.

25. The disk drive of claim 24 further comprising a base plate, wherein the first suspension assembly includes a mounting surface that generally faces away from the first storage disk, and the base plate secures the mounting surface to the first actuator arm, the base plate including (i) a beam mount surface that engages the mounting surface of the suspension assembly, the beam mount surface substantially facing the first storage disk, and (ii) a plate mount surface that is secured to the first actuator arm, the plate mount surface facing in a direction that is substantially opposite the beam mount surface.

26. The disk drive of claim 24 further comprising a base plate, wherein the suspension assembly includes a mounting surface, and the base plate couples the mounting surface of the suspension assembly to a distal section of the first actuator arm, the base plate being positioned substantially between the mounting surface and the distal section of the first actuator arm.

27. A disk drive comprising:

a storage disk having an inner diameter and an outer diameter;

a data transducer that moves between the inner diameter and the outer diameter of the storage disk;

a suspension assembly that supports the data transducer, the suspension assembly including a mounting surface that faces generally away from the storage disk; and an actuator arm that supports the suspension assembly, the actuator arm having a roll-bias angle along at least a majority of the length of the actuator arm the roll-bias angle having an absolute value of greater than 0.1 degrees relative to the storage disk, the actuator arm maintaining the mounting surface at a suspension z-height that reduces vibration of the data transducer when the data transducer moves between the inner diameter and the outer diameter of the storage disk.

28. The disk drive of claim 27 wherein the actuator arm has a roll-bias angle along substantially the entire length of the actuator arm.

29. The disk drive of claim 27 wherein the actuator arm has a roll-bias angle along at least approximately seventy-five percent of the length of the actuator arm.

30. The disk drive of claim 27 further comprising a base plate that couples the mounting surface of the suspension assembly to a distal section of the actuator arm, the base plate being positioned substantially between the mounting surface and the distal section of the actuator arm.

31. The disk drive of claim 27 further comprising a base plate that couples the mounting surface of the suspension assembly to the actuator arm, wherein the mounting surface is positioned at a z-height of between approximately 0.40–0.65 millimeters away from the storage disk.

32. The disk drive of claim 27 further comprising a base plate that couples the mounting surface of the suspension assembly to the actuator arm, wherein the mounting surface is positioned at a z-height of less than approximately 0.45 millimeters away from the storage disk.

33. A method for manufacturing a disk drive, the method comprising the steps of:

rotatably mounting an actuator hub to a drive housing; and securing a first actuator arm having a roll-bias angle over a majority of the length of the first actuator arm to the actuator hub, the roll bias angle having an absolute valve of greater than 0.1 degrees relative to the first storage disk.

34. The method of claim 33 further including the step of securing a first suspension assembly to the first actuator arm, the first suspension assembly having an assembly mounting surface, wherein a z-height of the assembly mounting surface relative to the first storage disk is between approximately 0.27–0.65 millimeters.

* * * * *

UNITED STATES PATENT AND TRADEMARK OFFICE
CERTIFICATE OF CORRECTION

PATENT NO.     : 6,738,229 B2
DATED          : May 18, 2004
INVENTOR(S)    : Williams It is certified that error appears in the above-identified patent and that said Letters Patent is hereby corrected as shown below:

Column 13,
Line 49, please insert a comma between the words "disk" and "the".

Column 16,
Line 55, please insert a comma between the words "arm" and "the".

Signed and Sealed this

Twenty-seventh Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,738,229 B2
DATED : May 18, 2004
INVENTOR(S) : Williams

It is certified that error appears in the above-identified patent and that said Letters Patent is hereby corrected as shown below:

Column 2,
Lines 7-8, please delete ", and assigned to Quantum Corporation. the assignee of the present invention".

Column 10,
Line 60, please delete "0.67" and substitute therefore -- 0.27 --.
Line 60, please delete the word "minimized" and substitute therefore -- reduced --.
Line 63, after "(938.36 Hz)", please add -- at various skew angles --.

Column 11,
Lines 2, 12, 22, 32, 52 and 62, please delete the word "minimized" and substitute therefore -- reduced --.
Line 5, after "(1432.2 Hz)", please add -- at various skew angles --.
Lines 12, 32 and 52, please delete "0.67" and substitute therefore -- 0.27 --.
Lines 15 and 35, after "(938.36 Hz)", please add -- at various skew angles --.
Lines 25, 45 and 65, after "(1432.2 Hz)", please add -- at various skew angles --.
Line 55, after "(936.36 Hz)", please add -- at various skew angles --.

Column 13,
Line 49, please insert a comma between the words "disk" and "the".

Column 16,
Line 55, please insert a comma between the words "arm" and "the".

Signed and Sealed this

Sixteenth Day of November, 2004

JON W. DUDAS
*Director of the United States Patent and Trademark Office*